US007253251B2

(12) United States Patent
Lee et al.

(10) Patent No.: US 7,253,251 B2
(45) Date of Patent: Aug. 7, 2007

(54) WATER SOLUBLE THERMOSETTING POLYESTER RESIN COMPOSITION AND METHOD OF PREPARING THE SAME

(75) Inventors: Ju-Kil Lee, Sungnam (KR); Deok-Min Park, Anyang (KR)

(73) Assignee: DPI Co., Ltd. (KR)

( * ) Notice: Subject to any disclaimer, the term of this patent is extended or adjusted under 35 U.S.C. 154(b) by 474 days.

(21) Appl. No.: 10/748,638

(22) Filed: Dec. 30, 2003

(65) Prior Publication Data

US 2005/0176884 A1 Aug. 11, 2005

(30) Foreign Application Priority Data

Dec. 30, 2002 (KR) ...................... 10-2002-0086943

(51) Int. Cl.
*C08G 63/02* (2006.01)
*C08G 63/12* (2006.01)
*C08G 63/16* (2006.01)
*C08G 18/42* (2006.01)
*C08F 20/00* (2006.01)
*C08F 283/00* (2006.01)
*C08L 67/02* (2006.01)

(52) U.S. Cl. ...................... 528/296; 528/302; 528/308; 528/308.6; 525/444; 525/539; 525/540

(58) Field of Classification Search ................ 528/272, 528/296, 302, 308, 308.6; 525/437, 444, 525/539, 540; 524/604

See application file for complete search history.

(56) References Cited

U.S. PATENT DOCUMENTS 5,686,553 A * 11/1997 Tai et al. .................... 528/194
6,369,133 B2 * 4/2002 Kitabatake .................. 523/410
6,887,909 B2 * 5/2005 Kawamura et al. ........... 521/48

* cited by examiner

*Primary Examiner*—Nathan M. Nutter
(74) *Attorney, Agent, or Firm*—Cantor Colburn LLP

(57) ABSTRACT

A water soluble thermosetting polyester resin composition for undercoating a PCM steel sheet is prepared from about 100 parts by weight of thermosetting polyester resin obtained by condensing polyethylene terephthalate using glycol and polybasic acid, about 5-20 parts by weight of anhydrous polybasic acid and amine. A paint composition prepared using thus prepared resin composition is applicable for undercoating PCM steel sheet for both of home appliances and construction materials. In addition, an organic solvent included in the conventional oily paint composition can be excluded to minimize an environmental contamination, a dangerous factor of initiating fire and a bodily harm on human. Further, a paint composition having advantageous processibility, chemical resistance, solvent resistance, adhesion and scratch resistance may be prepared.

12 Claims, No Drawings

WATER SOLUBLE THERMOSETTING POLYESTER RESIN COMPOSITION AND METHOD OF PREPARING THE SAME

CROSS REFERENCE TO RELATED APPLICATION

This application claims priority under 35 USC §119 to Korean Patent Application No. 2002-86943, filed on Dec. 30, 2002, the contents of which are incorporated herein by reference in their entirety.

BACKGROUND OF THE INVENTION

1. Field of the Invention

The invention relates to a water soluble thermosetting polyester resin composition and a method of preparing the same, and more particularly, to a water soluble thermosetting polyester resin composition for applying to a paint composition for undercoating a pre-coated metal (PCM) steel sheet and a method of preparing the same.

2. Description of the Related Art

Generally, a resin of paint compositions for coating a PCM steel sheet includes an acryl based resin, an urethane based resin, an epoxy based resin, a polyester based resin, a silicon based resin, a fluorine based resin, a polyvinylchloride based resin and the like. Most paint compositions are an oil type and a thermosetting type. The polyester based resin and the epoxy based resin are widely used except for a product requiring a special paint composition having specific physical properties. Among them, the paint composition employing the polyester based resin is most widely used.

The physical properties required for the paint composition for the PCM steel sheet are as follows: 1) a good mechanical property including a processibility and a pencil hardness representing the flexibility after implementing the coating process, adhesiveness to a substrate or to a topcoat layer and antifriction property, 2) a good chemical property including acid resistance, alkaline resistance, MEK rubbing property, weather resistance and the like, and 3) a good working efficiency influencing productivity and cost.

The paint composition used for undercoating the PCM steel sheet until now is mainly classified into a polyester based paint composition and an epoxy based paint composition. The polyester based paint composition for undercoating the PCM steel sheet has good processibility after finishing coating a top, good chemical resistance and good working efficiency. The polyester based paint composition, however, has a bad adhesion to the topcoat or the substrate and weak scratch resistance.

Meantime, the epoxy based paint composition for undercoating the PCM steel sheet has good adherence to the topcoat or the substrate and good scratch resistance. However, the processibility of the epoxy based paint composition is worse than that of the polyester based paint composition.

As described above, based on the different and complementary physical properties of the two kinds of paint compositions, the polyester based paint composition and the epoxy based paint composition, for undercoating the PCM steel sheet, form two separate markets for home appliances and for construction materials. Therefore, a combined type paint composition for the undercoating including the advantages of the polyester based paint composition and the epoxy based paint composition is required.

In addition, since the paint compositions are oil type, solvents added for controlling the working efficiency are aromatic or aliphatic solvents having a high boiling point, and the solvents are added excessively. Therefore, the compositions accompany an environmental contamination, and are harmful to human body. Instead of using the paint compositions including the organic solvents, the utilization of a water-dispersing type urethane resin has been preferred. However, the urethane resin has a relatively weak chemical resistance, solvent resistance, adherence, scratch resistance and thus it is inappropriate when used for coating the PCM steel sheet. Therefore, the oil type and thermosetting polyester based resin or the epoxy-based resin is regarded as the best.

SUMMARY OF THE INVENTION

It is a feature of the present invention to provide a water soluble thermosetting polyester resin composition having an improved adherence to a topcoat or a substrate when compared to the conventional polyester-based paint composition for undercoating the PCM steel sheet and for applying to a combined paint composition for undercoating the PCM steel sheet for home appliances and for construction materials.

Another feature of the invention is to provide an advantageous method of preparing a water soluble thermosetting polyester resin composition having an improved adhesion to a topcoat or to a substrate when compared to the conventional polyester based paint composition for undercoating the PCM steel sheet and for applying to a combined paint composition for undercoating the PCM steel sheet for home appliances and for construction materials.

In accordance with one aspect of the present invention, there is provided a water soluble thermosetting polyester resin composition prepared from about 100 parts by weight of thermosetting polyester resin obtained by condensing polyethylene terephthalate using glycol and polybasic acid, and about 5-20 parts by weight of anhydrous polybasic acid and amine.

In accordance with another aspect of the present invention, there is provided a method of preparing a water soluble thermosetting polyester resin composition as follows. First, a polyester resin is prepared by adding glycol and polybasic acid into polyethylene terephthalate, and is condensed. Then, about 5-20 parts by weight of anhydrous polybasic acid is added into about 100 parts by weight of thus prepared polyester resin to carry out a ring opening addition or condensation polymerization reaction. After that, amine is added for neutralization until pH of thus prepared product through the ring opening addition or condensation polymerization reaction becomes about 7-9.

In particular, the prepared water soluble thermosetting polyester resin composition has an acid value of about 60-80, a hydroxyl value of about 50-120, and a water diluting property of about 300% or more.

The water soluble thermosetting polyester resin composition prepared by the above described method solves the problem of low adhesion to the substrate or topcoat resulted by the conventional polyester based paint composition and the problem of poor processibility exhibited by the conventional epoxy based paint composition. Therefore, the two divided systems of the paint composition for undercoating can be unified. In addition, since the paint composition for the undercoating excludes an organic solvent, it is not fire hazardous, environmentally contaminating or harmful on human body, thus damage can be minimized.

DETAILED DESCRIPTION OF THE INVENTION

The invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

When the water soluble thermosetting polyester resin composition is applied to a paint composition for undercoating a PCM steel sheet, the processibility of the paint composition and the adhesion to the substrate or a topcoat can be improved. In addition, the problems of smelling within working surroundings, a possibility of danger of fire, damage to human body, contamination of environment and the like can be resolved. Further, the problem of weak adhesion to the substrate or the topcoat due to an increase of flexibility and poor scratch resistance can be solved.

The above described water soluble thermosetting polyester resin composition is obtained as follows. A ring opening addition or condensation polymerization reaction is implemented using about 100 parts by weight of polyester resin prepared by condensing polyethylene terephthalate using glycol and polybasic acid, and about 5-20 parts by weight of anhydrous polybasic acid. After that, the obtained product is neutralized using an amine compound.

Polyethylene terephthalate is obtained by condensing ethylene glycol and terephthalic acid at a high temperature. The obtained polyethylene terephthalate exhibits almost the same surface scratch property with that of the epoxy based resin, and exhibits almost the same flexibility as the polyester based resin. In addition, an injection molding may be performed using polyethylene terephthalate.

The polyester resin is obtained by diluting polyethylene terephthalate with glycol to impart the fluidity and then by condensing polybasic acid. Thus prepared polyester has an acid value of about 20-30, a hydroxyl value of about 50-120 and a molecular weight of about 8,000-20,000.

The water soluble thermosetting polyester resin composition of the invention is obtained by implementing a ring opening addition or condensation polymerization reaction using the polyester resin and polybasic acid, and neutralizing the obtained product using an amine to impart hydrophilicity. The obtained water soluble thermosetting polyester resin composition has pH of about 7-9, a solid content of about 50-60%, a molecular weight of about 9,000-30,000 and a water diluting property of about 300% or more.

The method of preparing the water soluble thermosetting polyester resin composition practically includes the following four step processes. Through the first step process, polyethylene terephthalate is synthesized and through the second step process, polyester resin having advantageous processibility, adherence and scratch resistance is prepared. According to the third step, a condensation polymerization reaction with anhydrous polybasic acid or a ring opening addition polymerization reaction is carried out to introduce an appropriate acid value to obtain a water soluble resin. At last, the obtained product according to the third step is neutralized using an amine compound to impart a hydrophilic functional group to obtain the water soluble thermosetting polyester resin through the fourth step.

The method of preparing the water soluble thermosetting polyester resin composition will be described in more detail below.

According to the first step, ethylene glycol and terephthalic acid are condensed under a high temperature to prepare polyethylene terephthalate having a molecular weight of about 1,500-2,000 in order to endow the surface portion thereof with processibility and scratch resistance.

In order to prepare polyethylene terephthalate, generally applied synthetic method for preparing polyethylene terephthalate for an injection molding can be used. First, a column manufactured by packing a vertical condenser is attached to a reaction vessel, and a trap for condensing and refluxing condensed water also is attached to the reaction vessel. Then, the temperature is gradually elevated under a nitrogen gas atmosphere. When the temperature reaches to the temperature for producing the condensed water, that is, about 145-165° C., this temperature is maintained for about 1 hour. After that, the temperature is increased to about 220-250° C. for about 3 hours, and kept for a while to obtain polyethylene terephthalate having a final acid value of about 5 or less and a molecular weight of about 1,500-2,000. At this time, the mixing ratio of terephthalic acid and ethylene glycol added for the preparation of polyethylene terephthalate is about 1.0:1.0-1.4 by equivalent.

When the mixing ratio of ethylene glycol with respect to terephthalic acid is less than about 1.0:1.0 by equivalent, the obtained resin is opaque and has a high viscosity. Here, a polymerization reaction proceeds to lower compatibility. When the mixing ratio of ethylene glycol with respect to terephthalic acid exceeds about 1.0:1.4 by equivalent, a resin having a low molecular weight is obtained to lower the scratch resistance.

Therefore, the preferred mixing ratio of terephthalic acid and ethylene glycol is about 1.0:1.0-1.4 by equivalent, more preferably, about 1.0:1.10-1.20 to obtain a resin having appropriate properties.

According to the second step, polyethylene terephthalate prepared by the first step is diluted to an appropriate concentration using general glycol for synthesizing polyester resin in order to impart fluidity. Then, an appropriate amount of polybasic acid, that is, aromatic or aliphatic dibasic acid is added into the reaction vessel and the reaction temperature is increased to and kept to about 220-260° C. while injecting nitrogen gas continuously to implement a condensation reaction to produce polyester resin having an acid value of about 20-30, a hydroxyl value of about 50-120 and a molecular weight of about 8,000-12,000.

Here, examples of glycol used to prepare the polyester resin include ethylene glycol, propylene glycol, 1,4-butylene glycol, 1,6-hexanediol, neopentyl glycol, methyl propanediol, cyclohexane dimethanol, hydrogenated bisphenol A, ethylene oxide added bisphenol A, propylene oxide added bisphenol A, ethylene oxide added bisphenol F, propylene oxide added bisphenol F, ethylene oxide added bisphenol S, propylene oxide added bisphenol S and the like. These compounds can be used alone or in a mixture threreof.

Additionally, examples of the polybasic acid include isophthalic acid, terephthalic acid, adipic acid, azelaic acid, sebacic acid, cyclohexane diacid, and the like. These compounds can be used alone or in a mixture thereof.

Here, the preferred mixing amount of glycol and polybasic acid is about 1.0:1.0-1.1 by equivalent to prepare the water soluble thermosetting polyester resin composition. When the mixing amount of glycol and polybasic acid is about 1.0:1.0 or less by equivalent and the amount of glycol is larger than the amount of polybasic acid, an adhesive property during coating thus prepared water soluble thermosetting polyester resin composition to a substrate or a topcoat is poor and so is scratch resistance. When the mixing amount of glycol and polybasic acid is about 1.0:1.1 or more by equivalent and the amount of glycol is less than that of polybasic acid, the molecular weight of the obtained product is excessively increased before reaching the desired acid value and a gelation during reaction is liable to occur. Then, the hydroxyl value is lowered during a ring opening addition or condensation polymerization reaction to deteriorate reactivity and adhesiveness. Further, processibility, water resistance and chemical resistance are deteriorated owing to remaining acids.

Therefore, the preferred mixing ratio of glycol and polybasic acid is in the range of about 1.0:1.0-1.1 by equivalent and more preferably, in the range of about 1.00:1.05-1.08.

When the acid value of polyester resin is less than about 20, an excessive degree of polymerization proceeds to exceed the molecular weight of the product of about 20,000 generating a vigorous bubbling during reaction. In addition, the viscosity of the product is rapidly increased inducing a gelation. Further, a dilution using only water is impossible and thus an addition of a portion of hydrophilic organic solvent is inevitable. When the acid value of polyester resin exceeds about 30, polyester having a low molecular weight of about 8,000 or less is prepared. Therefore, adhesive property and hardness of the final product are unfavorably lowered. Therefore, the preferred acid value of polyester resin is about 20-30.

When the hydroxyl value of the polyester resin is less than about 50, a hardening density of thus prepared paint composition is lowered to deteriorate a surface hardness. When the hydroxyl value of the polyester resin exceeds about 120, the processibility and chemical resistance of the paint composition are lowered. Therefore, the preferred hydroxyl value of the polyester resin is in the range of about 50-120 and more preferably, about 60-80.

According to the third step, in order to impart thus polymerized polyester resin by the second step with a hydrophilic functional group and to maintain an appropriate acid value, about 5-20 parts by weight of anhydrous polybasic acid based on 100 parts by weight of polyester resin is added. A ring opening addition or condensation polymerization reaction is carried out at about 140-220° C. to prepare a thermosetting polyester resin having a final acid value of about 60-80.

The anhydrous polybasic acid includes anhydrous maleic acid, anhydrous phthalic acid, anhydrous tetrahydrophthalic acid, trimelletic anhydride and the like. These compounds can be used alone or in a mixture thereof.

Here, when the acid value of the thermosetting polyester resin is about 60 or less, a water diluting property is poor after implementing a neutralization reaction using an amine compound during the subsequent fourth step and an external appearance of the resin becomes opaque as in emulsion state. In addition, the gloss and external properties of finally formed coated layer are deteriorated. When the acid value of the resin exceeds about 80, the water diluting property and the external appearance of the resin are enhanced, whereas the hardness and adhesion of the coated layer is lowered accompanying a large number of bubbles generated during preparing a paint composition.

Therefore, the preferred acid value of the thermosetting polyester resin to obtain the water soluble thermosetting polyester resin according to the invention is in a range of about 60-80, and more preferably, in a range of about 65-75.

According to the fourth step, the thermosetting polyester resin prepared through the third step is titrated with an amine compound under the temperature of about 70° C. or less in order to impart the thermosetting polyester resin with hydrophilic property and to neutralize the resin until the pH of the resin becomes about 7-9. Then, a water soluble thermosetting polyester resin composition having the pH of about 7-9, a molecular weight of about 9,000-30,000 and a water diluting property of about 300% or more is obtained. The obtained resin composition is diluted using water until the solid content becomes about 50-70%.

Examples of amines used for the neutralization include ethylene diamine, dimethyl ethanolamine, triethylamine, diethanolamine, triethanolamine, monoethanolamine, diethylethanolamine, diethylethylenediamine, monoethylamine, dipropylethanolamine, diethylcyclohexylamine, diethylene triamine, dioctylamine, dioctylaminoethanol and the like. These compounds can be used alone or in a mixture thereof.

When the pH of thus prepared water soluble thermosetting polyester resin composition is less than about 7, an organic solvent should be used due to poor water diluting property. When the pH of the resin exceeds about 9, bubbles are vigorously generated. Therefore, the preferred pH range of the water soluble thermosetting polyester resin composition is in a range of about 7.5-8.5.

Hereinbelow, the preferred embodiments of the invention will be described in detail with reference to Comparative Examples.

EXAMPLE 1

A water soluble thermosetting polyester resin composition was prepared by using the materials illustrated in Table 1.

TABLE 1

| Components | Amount (g) |
|---|---|
| Ethylene glycol | 51 |
| Terephthalic acid | 124 |
| Neopentyl glycol | 158 |
| Diethylene glycol | 40 |
| Adipic acid | 30 |
| Isophthalic acid | 250 |
| Trimellitic anhydride | 50 |
| Dimethyl ethanolamine | 65 |

A thermometer, a condenser, a stirrer, a condenser for removing water and a temperature elevating apparatus were attached to a 2-L 4-neck flask. 51 g of ethylene glycol and 124 g of terephtahlic acid were added into the flask and slowly stirred. The temperature of the reactant was elevated to 160° C. and kept for 1 hour while injecting nitrogen gas. Then, the temperature was elevated to 240° C. for 3 hours to prepare polyethylene terephthalate having an acid value of 5 or less. After that, polyethylene terephthalate was cooled and 158 g of neopentyl glycol, 40 g of diethylene glycol, 30 g of adipic acid and 250 g of isophthalic acid were added and then slowly stirred. Then, the temperature was elevated to 250° C. to carry out a condensation reaction to prepare a polyester resin having an acid value of 27, a hydroxyl value of 75 and a molecular weight of 12,500. Into the obtained polyester resin, 50 g of trimellitic anhydride was added and the temperature was maintained at 160° C. to prepare a thermosetting polyester resin having an acid value of 68. At the temperature of 60° C., 65 g of dimethyl ethanolamine was added to neutralize the resin until the pH of the resin became 8. Then, the resin was diluted using water to prepare a water soluble thermosetting polyester resin having a solid content of 55% and a molecular weight of 13,200.

EXAMPLE 2

A water soluble thermosetting polyester resin composition was prepared by using the materials illustrated in Table 2.

TABLE 2

| Components | Amount (g) |
|---|---|
| Ethylene glycol | 51 |
| Terephthalic acid | 124 |
| Neopentyl glycol | 40 |
| Diethylene glycol | 160 |
| Adipic acid | 30 |
| phthalic acid | 225 |
| Trimellitic anhydride | 54 |
| Dimethyl ethanolamine | 68 |

A thermometer, a condenser, a stirrer, a condenser for removing water and a temperature elevating apparatus were attached to a 2-L 4-neck flask. 51 g of ethylene glycol and 124 g of terephtahlic acid were added into the flask and then slowly stirred. The temperature of the reactant was elevated to 160° C. and kept for 1 hour while injecting nitrogen gas. Then, the temperature was elevated to 240° C. for 3 hours to prepare polyethylene-terephthalate having an acid value of 5 or less. After that, polyethylene terephthalate was cooled and 40 g of neopentyl glycol, 160 g of diethylene glycol, 30 g of adipic acid and 225 g of phthalic acid were added and slowly stirred. Then, the temperature was elevated to 250° C. to carry out a condensation reaction to prepare a polyester resin having an acid value of 30, a hydroxyl value of 0.70 and a molecular weight of 10,200. Into the obtained polyester resin, 54 g of trimellitic anhydride was added and the temperature was maintained at 160° C. to prepare a thermosetting polyester resin having an acid value of 68. At the temperature of 60° C., 68 g of dimethyl ethanolamine was added to neutralize the resin until the pH of the resin became 7.5. Then, the resin was diluted using water to prepare a water soluble thermosetting polyester resin having a solid content of 55% and a molecular weight of 12,100.

EXAMPLE 3

A water soluble thermosetting polyester resin composition was prepared by using the materials illustrated in Table 3.

TABLE 3

| Components | Amount (g) |
|---|---|
| Ethylene glycol | 60 |
| Terephthalic acid | 124 |
| 1,6-hexanediol | 178 |
| Neopentyl glycol | 40 |
| Sebacic acid | 42 |
| Terephthalic acid | 252 |
| Trimellitic anhydride | 64 |
| Dimethyl ethanolamine | 67 |

A thermometer, a condenser, a stirrer, a condenser for removing water and a temperature elevating apparatus were attached to a 2-L 4-neck flask. 60 g of ethylene glycol and 124 g of terephtahlic acid were added into the flask and slowly stirred. The temperature of the reactant was elevated to 160° C. and kept for 1 hour while injecting nitrogen gas. Then, the temperature was elevated to 240° C. for 3 hours to prepare polyethylene terephthalate having an acid value of 5 or less. After that, polyethylene terephthalate was cooled and 178 g of 1,6-hexanediol, 41 g of neopentyl glycol, 42 g of sebacic acid and 252 g of terephthalic acid were added and then slowly stirred. Then, the temperature was elevated to 250° C. to carry out a condensation reaction to prepare a polyester resin having an acid value of 25, a hydroxyl value of 75 and a molecular weight of 15,200. Into the obtained polyester resin, 54 g of trimellitic anhydride was added and the temperature was maintained at 215° C. to prepare a thermosetting polyester resin having an acid value of 65. At the temperature of 60° C., 68 g of dimethyl ethanolamine was added to neutralize the resin until the pH of the resin became 8.5. Then, the resin was diluted using water to prepare a water soluble thermosetting polyester resin having a solid content of 55% and a molecular weight of 15,100.

EXAMPLE 4

A water soluble thermosetting polyester resin composition was prepared by using the materials illustrated in Table 4.

TABLE 4

| Components | Amount (g) |
|---|---|
| Ethylene glycol | 60 |
| Terephthalic acid | 124 |
| Neopentyl glycol | 195 |
| Sebacic acid | 42 |
| Terephthalic acid | 252 |
| Trimellitic anhydride | 74 |
| Dimethyl ethanolamine | 72 |

A thermometer, a condenser, a stirrer, a condenser for removing water and a temperature elevating apparatus were attached to a 2-L 4-neck flask. 60 g of ethylene glycol and 124 g of terephtahlic acid were added into the flask and slowly stirred. The temperature of the reactant was elevated to 160° C. and kept for 1 hour while injecting nitrogen gas. Then, the temperature was elevated to 240° C. for 3 hours to prepare polyethylene terephthalate having an acid value of 5 or less. After that, polyethylene terephthalate was cooled and 195 g of neopentyl glycol, 42 g of sebacic acid and 252 g of terephthalic acid were added and then slowly stirred. Then, the temperature was elevated to 250° C. to carry out a condensation reaction to prepare a polyester resin having an acid value of 28, a hydroxyl value of 65 and a molecular weight of 18,700. Into the obtained polyester resin, 74 g of trimellitic anhydride was added and the temperature was maintained at 215° C. to prepare a thermosetting polyester resin having an acid value of 75. At the temperature of 60° C., 72 g of dimethyl ethanolamine was added to neutralize the resin until the pH of the resin became 9. Then, the resin was diluted using water to prepare a water soluble thermosetting polyester resin having a solid content of 55% and a molecular weight of 17,100.

EXAMPLE 5

A water soluble thermosetting polyester resin composition was prepared by using the materials illustrated in Table 5.

TABLE 5

| Components | Amount (g) |
|---|---|
| Ethylene glycol | 65 |
| Terephthalic acid | 124 |
| 1,6-hexanediol | 178 |
| Diethylene glycol | 41 |
| Sebacic acid | 42 |
| Isophthalic acid | 252 |
| Trimellitic anhydride | 54 |
| Dimethyl ethanolamine | 72 |

A thermometer, a condenser, a stirrer, a condenser for removing water and a temperature elevating apparatus were attached to a 2-L 4-neck flask. 65 g of ethylene glycol and 124 g of terephthalic acid were added into the flask and slowly stirred. The temperature of the reactant was elevated to 160° C. and kept for 1 hour while injecting nitrogen gas. Then, the temperature was elevated to 240° C. for 3 hours to prepare polyethylene terephthalate having an acid value of 5 or less. After that, polyethylene terephthalate was cooled and 178 g of 1,6-hexanediol, 41 g of diethylene glycol, 41 g of sebacic acid and 252 g of isophthalic acid were added and then slowly stirred. Then, the temperature was elevated to 250° C. to carry out a condensation reaction to prepare a polyester resin having an acid value of 20, a hydroxyl value of 85 and a molecular weight of 12,700. Into the obtained polyester resin, 54 g of trimellitic anhydride was added and the temperature was maintained 215° C. to prepare a thermosetting polyester resin having an acid value of 75. At the temperature of 60° C., 72 g of dimethyl ethanolamine was added to neutralize the resin until the pH of the resin became 7.8. Then, the resin was diluted using water to prepare a water soluble thermosetting polyester resin having a solid content of 55% and a molecular weight of 12,800.

EXAMPLE 6

A water soluble thermosetting polyester resin composition was prepared by using the materials illustrated in Table 6.

TABLE 6

| Components | Amount (g) |
|---|---|
| Ethylene glycol | 65 |
| Terephthalic acid | 124 |
| Diethylene glycol | 178 |
| 1,6-hexanediol | 41 |
| Sebacic acid | 42 |
| Isophthalic acid | 252 |
| Trimellitic anhydride | 54 |
| Triethylamine | 72 |

A thermometer, a condenser, a stirrer, a condenser for removing water and a temperature elevating apparatus were attached to a 2-L 4-neck flask. 65 g of ethylene glycol and 124 g of terephtahlic acid were added into the flask and slowly stirred. The temperature of the reactant was elevated to 160° C. and kept for 1 hour while injecting nitrogen gas. Then, the temperature was elevated to 240° C. for 3 hours to prepare polyethylene terephthalate having an acid value of 5 or less. After that, polyethylene terephthalate was cooled and 160 g of diethylene glycol, 46 g of 1,6-hexanediol, 42 g of sebacic acid and 252 g of terephthalic acid were added and then slowly stirred. Then, the temperature was elevated to 250° C. to carry out a condensation reaction to prepare a polyester resin having an acid value of 26, a hydroxyl value of 90 and a molecular weight of 11,500. Into the obtained polyester resin, 77 g of trimellitic anhydride was added and the temperature was kept to 190° C. to prepare a thermosetting polyester resin having an acid value of 75. At the temperature of 40° C., 72 g of triethylamine was added to neutralize the resin until the pH of the resin became 7.8. Then, the resin was diluted using water to prepare a water soluble thermosetting polyester resin having a solid content of 55% and a molecular weight of 12,500.

EXAMPLE 7

A water soluble thermosetting polyester resin composition was prepared by using the materials illustrated in Table 7.

TABLE 7

| Components | Amount (g) |
|---|---|
| Ethylene glycol | 60 |
| Terephthalic acid | 124 |
| 1,6-hexanediol | 178 |
| 1,4-butylene glycol | 35 |
| Sebacic acid | 42 |
| Isophthalic acid | 252 |
| Trimellitic anhydride | 54 |
| Triethylamine | 72 |

A thermometer, a condenser, a stirrer, a condenser for removing water and a temperature elevating apparatus were attached to a 2-L 4-neck flask. 60 g of ethylene glycol and 124 g of terephtahlic acid were added into the flask and slowly stirred. The temperature of the reactant was elevated to 160° C. and kept for 1 hour while injecting nitrogen gas. Then, the temperature was elevated to 240° C. for 3 hours to prepare polyethylene terephthalate having an acid value of 5 or less. After that, polyethylene terephthalate was cooled and 178 g of 1,6-hexanediol, 35 g of 1,4-butylene glycol, 42 g of sebacic acid and 252 g of isophthalic acid were added and then slowly stirred. Then, the temperature was elevated to 250° C. to carry out a condensation reaction to prepare a polyester resin having an acid value of 26, a hydroxyl value of 90 and a molecular weight of 11,500. Into the obtained polyester resin, 77 g of trimellitic anhydride was added and the temperature was kept to 190° C. to prepare a thermosetting polyester resin having an acid value of 75. At the temperature of 40° C., 72 g of triethylamine was added to neutralize the resin until the pH of the resin became 7.8. Then, the resin was diluted using water to prepare a water soluble thermosetting polyester resin having a solid content of 55% and a molecular weight of 12,500.

EXPERIMENTS 1-7 AND COMPARATIVE EXPERIMENTS 1 & 2

Preparation of Paint Compositions for Undercoating PCM Steel Sheet

Paint compositions for undercoating a PCM steel sheet including the water soluble thermosetting polyester resin composition according to the invention and other components illustrated in Table 8 were prepared. In order to compare the properties of thus prepared paint compositions, the paint compositions including the conventional polyester resin and the conventional epoxy resin for undercoating the PCM steel sheet were prepared.

TABLE 8

| Components | Contents (wt %) Paint compositions of Experiments 1–7 | Paint composition of Comparative Experiment 1 | Paint composition of Comparative Experiment 2 |
|---|---|---|---|
| Resin compositions of Examples 1–7 | 30 | | |
| Conventional polyester resin | | 30 | |
| Conventional epoxy resin | | | 25 |
| Melamine curing agent 1) | 3.5 | 3.5 | 2.0 |
| TiO2 | 10 | 10 | 8.0 |
| SrCrO4 | 10 | 10 | 12 |
| Acid catalyst 2) | 0.3 | 0.3 | 0.1 |
| Defoamer 3) | 0.5 | 0.5 | 0.3 |
| Deionized water | 43 | | |
| Solvent 4) | 2.7 | 45.7 | 52.5 |
| Dispersing agent 5) | | 0.1 | |
| Total | | 100 | |

Note 1) melamine curing agent: Cymel-325 purchased from CYTEC Co., America.
Note 2) acid catalyst: 4040 catalyst purchased from CYTEC Co., America.
Note 3) defoamer: BYK-020 purchased from BYK Co., Germany.
Note 4) solvent: Kocosol-150 purchased from SK Corporation, Korea, cyclohexanone, and Butylcellosolve purchased from SHELL Co., America.
Note 5) dispersing agent: ANTITERRA-U purchased from BYK Co., Germany.

Manufacture of Test Samples for Testing the Layer Properties

Zinc steel sheets were treated using zinc phosphoric acid and the paint compositions prepared using the components illustrated in Table 8 were one by one coated to manufacture undercoat layers. The thickness of the undercoat layer was 5±2 μm and the surface temperature sensed by the substrate was 224° C. Then, a paint composition obtained by using a thermosetting resin having a hydroxyl functional group content of 0.5-1%, a molecular weight of 13,000 and Tg of 12° C. for topcoating a PCM steel sheet was coated on the undercoat layer to obtain a test sample including a topcoat layer.

Estimation of Physical Properties of Coating Layers of Paint Compositions

The properties of the coating layer of the test samples were estimated by the following test methods.

1) Estimation of gloss was implemented according to a method described in ASTM-D-523 (a standard for determining reflected gloss by a non-metal material defined by American Society for Testing and Materials).

2) Estimation of MEK rubbing was implemented according to a method described in NCCA-II-18 (an estimating manner on a solvent resistance defined by National Coil Coaters Association).

3) Estimation of processibility was implemented according to a method described in NCCA-II-19 (a test method of "T" band defined by National Coil Coaters Association).

4) Estimation of a pencil hardness was implemented according to a method described in NCCA-II-12 (an estimating manner on a relative pencil hardness defined by National Coil Coaters Association).

5) Estimation of C.E.T. was implemented according to a method described in NCCA-II-20 (a test method on adhesion to a substrate defined by National Coil Coaters Association).

6) Estimation of acid resistance and alkaline resistance was implemented according to a method described in ASTM-D-1308 (a national standard on domestic chemicals used on a finishing material of organic materials defined by American Society for Testing and Materials).

7) Estimation on boiling water resistance: the substrate including the coating layer was immersed into boiling water for 24 hours and then, the change of the coated layer was observed with naked eyes.

8) Estimation on adhesion to the substrate or topcoat layer: The coated layer was scratched using a coin while applying homogeneous force. Then, the degree of the departure of the coated layer from the substrate or the topcoat layer was observed with naked eyes.

The data on physical properties of the coated layer obtained through the above described tests are illustrated in Table 9.

TABLE 9

| Paint composition | Exp. 1 | Exp. 2 | Exp. 3 | Exp. 4 | Exp. 5 |
|---|---|---|---|---|---|
| Gloss ($60_{\circ}$) | 92 | 92 | 92 | 93 | 90 |
| MEK rubbing | 100≧ | 100≧ | 100≧ | 100≧ | 100≧ |
| Processibility | 1T | 2T | 0T | 1T | 1T |
| Pencil hardness | H | F | F | F | H |
| C.E T | 100/100 | 100/100 | 100/100 | 100/100 | 100/100 |
| Acid resistance | good | good | good | good | good |
| Alkaline resistance | good | good | good | good | good |
| Boiling water resistance | good | common | good | good | good |
| Adhesion to substrate, topcoat | ⊚ | ○ | ○ | ⊚ | ⊚ |

| Paint composition | Exp. 6 | Exp. 7 | Com. Exp. 1 | Com. Exp. 2 |
|---|---|---|---|---|
| Gloss ($60_{\circ}$) | 91 | 90 | 91 | 87 |
| MEK rubbing | 100≧ | 100≧ | 100≧ | 100≧ |
| Processibility | 1T | 1T | 2T | 4T |
| Pencil hardness | F | F | F | H |
| C.E T | 100/100 | 100/100 | 100/100 | 100/100 |
| Acid resistance | good | good | good | good |
| Alkaline resistance | common | good | good | good |
| Boiling water resistance | common | good | good | good |
| Adhesion to substrate, topcoat | ⊚ | ⊚ | Δ | ○ |

In Table 9, Exp. represents Experiment and Com. Exp. represents Comparative Experiment. Further, the designated items representing the properties of the coated layer have the following meaning. For the adhesion to the substrate and topcoat layer, ⊚ represents excellent, ○ represents good, Δ represents common and X represents bad.

As described above, a paint composition for undercoating a PCM steel sheet including a water soluble thermosetting polyester resin composition according to the invention, solves the problem of low adhesion to the substrate or topcoat layer exhibited by the conventional polyester based paint composition for undercoating the PCM steel sheet and the problem of poor processibility exhibited by the conventional epoxy based paint composition for under coating the PCM steel sheet. Therefore, the two divided systems of the paint composition for undercoating can be unified.

In addition, since the paint composition for the undercoating excludes an organic solvent, it minimizes environmental contamination, harm on human body, and danger for initiating a fire. Further, a paint composition having good properties such as processibility, chemical resistance, solvent resistance and adhesion and scratch resistance can be prepared.

Exemplary embodiments of the invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the invention as set forth in the following claims.

What is claimed is:

1. A water soluble thermosetting polyester resin composition for undercoating a pre-coated metal steel sheet, prepared by:

reacting terephthalic acid with ethylene glycol in a molar ratio of terephthalic acid to ethylene glycol of about 1:1 to about 1:1.4 to produce polyethylene terephthalate;

condensing the polyethylene terephthalate with a glycol and a polybasic acid to produce a thermosetting polyester resin;

reacting about 100 parts by weight of the thermosetting polyester resin with about 5-to about 20 parts by weight of an anhydrous polybasic acid to produce a product; and adding an amine into the product until the pH of the product is about 7 to about 9.

2. The water soluble thermosetting polyester resin composition of claim 1, wherein the thermosetting polyester resin has an acid value of about 20- to about 30, a hydroxyl value of about 50- to about 120, and a molecular weight of about 8,000- to about 20,000.

3. The water soluble thermosetting polyester resin composition of claim 1, wherein the thermosetting polyester resin composition has an acid value of about 60- to about 80, a hydroxyl value of about 50- to about 120, and a water diluting property of about at least 300%.

4. A method of preparing a water soluble thermosetting polyester resin composition for undercoating a pre-coated metal steel sheet, comprising:

reacting terephthalic acid with ethylene glycol in a molar ratio of terephthalic acid to ethylene glycol of about 1:1 to about 1:1.4 to produce polyethylene terephthalate;

condensing the polyethylene terephthalate with a glycol and a polybasic acid to produce a thermosetting polyester resin;

reacting about 100 parts by weight of the thermosetting polyester resin with about 5 to about 20 parts by weight of an anhydrous polybasic acid through a ring opening addition or condensation polymerization reaction to produce a product; and adding an amine into the product for neutralization until the pH of the product is about 7 to about 9.

5. The method of preparing a water soluble thermosetting polyester resin composition of claim 4, wherein the thermosetting polyester resin is prepared by using a glycol and a polybasic acid with a molar ratio of the glycol to the polybasic acid of about 1:1 to about 1:1.1, and further wherein the thermosetting polyester resin has an acid value of about 20- to about 30, a hydroxyl value of about 50- to about 120, and a molecular weight of about 8,000- to about 20,000.

6. The method of preparing a water soluble thermosetting polyester resin composition of claim 4, wherein the glycol is at least one selected from the group consisting of ethylene glycol, propylene glycol, 1,4-butylene glycol, 1,6-hexanediol, neopentyl glycol, methylpropanediol, cyclohexane dimethanol, hydrogenated bisphenol A, ethylene oxide added bisphenol A, propylene oxide added bisphenol A, ethylene oxide added bisphenol F, propylene oxide added bisphenol F, ethylene oxide added bisphenol S, and propylene oxide added bisphenol S.

7. The method of preparing a water soluble thermosetting polyester resin composition of claim 4, wherein the polybasic acid is at least one selected from the group consisting of isophthalic acid, terephthalic acid, adipic acid, azelaic acid, sebacic acid, and cyclohexane diacid.

8. The method of preparing a water soluble thermosetting polyester resin composition of claim 4, wherein the anhydrous polybasic acid is at least one selected from the group consisting of anhydrous maleic acid, anhydrous phthalic acid, anhydrous tetrahydrophthalic acid, and trimellitic anhydride.

9. The method of preparing a water soluble thermosetting polyester resin composition of claim 4, wherein the amine is at least one selected from the group consisting of ethylene diamine, dimethyl ethanolamine, triethylamine, diethanolamine, triethanolamine, monoethanolamine, diethylethanolamine, diethylene diamine, monoethylamine, dipropyl ethanolamine, diethyl cyclohexylamine, diethylene triamine, dioctylamine, and dioctyl aminoethanol.

10. The method of preparing a water soluble thermosetting polyester resin composition of claim 4, further comprising adding deionized water for preparing a water soluble thermosetting polyester resin composition having a solid content of about 50- to about 60% percent by weight after adding the amine.

11. The method of preparing a water soluble thermosetting polyester resin composition of claim 10, wherein the thus prepared water soluble thermosetting polyester resin composition has an acid value of about 60- to about 80, a hydroxyl value of about 50- to about 120, and a water diluting property of about at least 300%.

12. The water soluble thermosetting polyester resin composition of claim 1, wherein the polyethylene terephthalate has a molecular weight of about 1,500- to about 2,000.

* * * * *